(12) United States Patent
Otaka

(10) Patent No.: US 8,159,730 B2
(45) Date of Patent: Apr. 17, 2012

(54) IMAGE READING APPARATUS AND IMAGE FORMING APPARATUS HAVING THE SAME

(75) Inventor: Hisashi Otaka, Toride (JP)

(73) Assignee: Canon Kabushiki Kaisha (JP)

( * ) Notice: Subject to any disclaimer, the term of this patent is extended or adjusted under 35 U.S.C. 154(b) by 438 days.

(21) Appl. No.: 12/478,893

(22) Filed: Jun. 5, 2009

(65) Prior Publication Data

US 2009/0303554 A1 Dec. 10, 2009

(30) Foreign Application Priority Data

Jun. 6, 2008 (JP) ................................. 2008-148989

(51) Int. Cl.
*H04N 1/04* (2006.01)
*G01V 3/00* (2006.01)

(52) U.S. Cl. ...... 358/488; 358/474; 358/498; 340/855.7

(58) Field of Classification Search ............... 340/855.7; 358/488, 474, 498

See application file for complete search history.

(56) References Cited

U.S. PATENT DOCUMENTS

2006/0244629 A1* 11/2006 Miyazaki et al. .......... 340/855.7

FOREIGN PATENT DOCUMENTS

| JP | 2001293691 A | * 10/2001 |
| JP | 2005078464 A | 3/2005 |
| JP | 2005244756 A | 9/2005 |
| JP | 2007021779 A | 2/2007 |

OTHER PUBLICATIONS

Japanese Office Action dated Jan. 31, 2012 issued in counterpart application No. JP2008-148989.

* cited by examiner

*Primary Examiner* — Charlotte M Baker
*Assistant Examiner* — Rury Grisham
(74) *Attorney, Agent, or Firm* — Rossi, Kimms & McDowell LLP

(57) ABSTRACT

An image reading apparatus and an image forming apparatus having an original base plate, a conveying unit which separates and conveys a bundle of original sheets sheet by sheet, a first image reading unit which reads image information from the one side of the original sheet, a second image reading unit which reads image information from the other side of the original sheet, and a detecting unit which detects image existence/non-existence information of each original sheet in a state that the bundle of original sheets is mounted on the original base plate, wherein the detecting unit includes an oscillating unit which oscillates an electromagnetic wave of 30 GHz to 100 THz and a receiving unit which receives a reflected wave of the electromagnetic wave reflected on each side of the sheet, thereby detecting the image existence/non-existence information of each original sheet based on the received electromagnetic wave information.

5 Claims, 7 Drawing Sheets

IMAGE READING APPARATUS AND IMAGE FORMING APPARATUS HAVING THE SAME

BACKGROUND OF THE INVENTION

1. Field of the Invention

The present invention relates to an image reading apparatus which automatically conveys and read an original sheet and an image forming apparatus having the image reading apparatus.

2. Description of the Related Art

Conventionally, in case of reading an image of one original sheet in a bundle of original sheets where one-sided original sheets and double-sided original sheets are mixedly stacked, there has been used an image reading apparatus capable of reading the side where image exists, by automatically detecting whether the original sheet is the one-sided original sheet or the double-sided original sheet.

As an example, Japanese Patent Application Laid-Open No. 2005-244756 discloses an image reading apparatus where an image existence/non-existence detecting sensor detects existence or non-existence of image on an image side of an conveying original sheet so that an image reading unit can read the image from only the image existing side without reading an image from the image non-existing side of the original sheet.

As another example, Japanese Patent Application Laid-Open No. 2005-078464 discloses an image reading apparatus where a bundle of original sheets is illuminated with an electromagnetic wave so as to detect stacked positions of the original sheets accordingly a delay time of a reflected or transmitted electromagnetic wave, and information on a surface of or in an inner portion of the bundle of original sheets is detected according to a time-varying waveform of the reflected or transmitted electromagnetic wave, so that the image reading can be performed in the bundle state.

However, in a technique of Japanese Patent Application Laid-Open No. 2005-244756, since existence or non-existence of image of the original sheet cannot be detected if the original sheet is not fed, the original sheets are fed sequentially to detect the image. Therefore, the reading of image for detecting the existence or non-existence of image and the reading of image for the original sheet need to be sequentially performed, so that the reading time is increased. In addition, since a to-be-transferred sheet cannot be fed if the detecting of the existence or non-existence of image is not performed, the productivity of image forming is decreased.

In addition, in a technique of Japanese Patent Application Laid-Open No. 2005-078464, in order to read all the image information in the bundled state, the image reading apparatus becomes complicated and expensive for reading position accuracy or the like. In addition, since the reading time is increased, the productivity of image forming is decreased.

The present invention provides an image reading portion capable of decreasing an image reading time and of reading image information with a high accuracy at low costs and an image forming apparatus having the same image reading portion.

SUMMARY OF THE INVENTION

According to an aspect of the present invention, there is provided an image reading apparatus including: an original base plate on which a bundle of original sheets are mounted; a conveying unit which separates and conveys the bundle of original sheets sheet by sheet; a first image reading unit which reads image information from the one side of the original sheet conveyed by the conveying unit; a second image reading unit which reads image information from the other side of the original sheet; and a detecting unit which detects image existence/non-existence information of each original sheet in a state that the bundle of original sheets is mounted on the original base plate, wherein the detecting unit includes an oscillating unit which oscillates an electromagnetic wave of 30 GHz to 100 THz and a receiving unit which receives a reflected wave of the electromagnetic wave reflected on each side of the sheet, thereby detecting the image existence/non-existence information of each original sheet based on the received electromagnetic wave information.

According to the present invention, it is possible to decrease an image reading time and to read image information with a high accuracy at low costs.

Further features of the present invention will become apparent from the following description of exemplary embodiments with reference to the attached drawings.

DESCRIPTION OF THE EMBODIMENTS

Embodiments of an image reading apparatus and an image forming apparatus according to the present invention will be described with reference to the attached drawings.

(Image Forming Apparatus)

Figure 1:
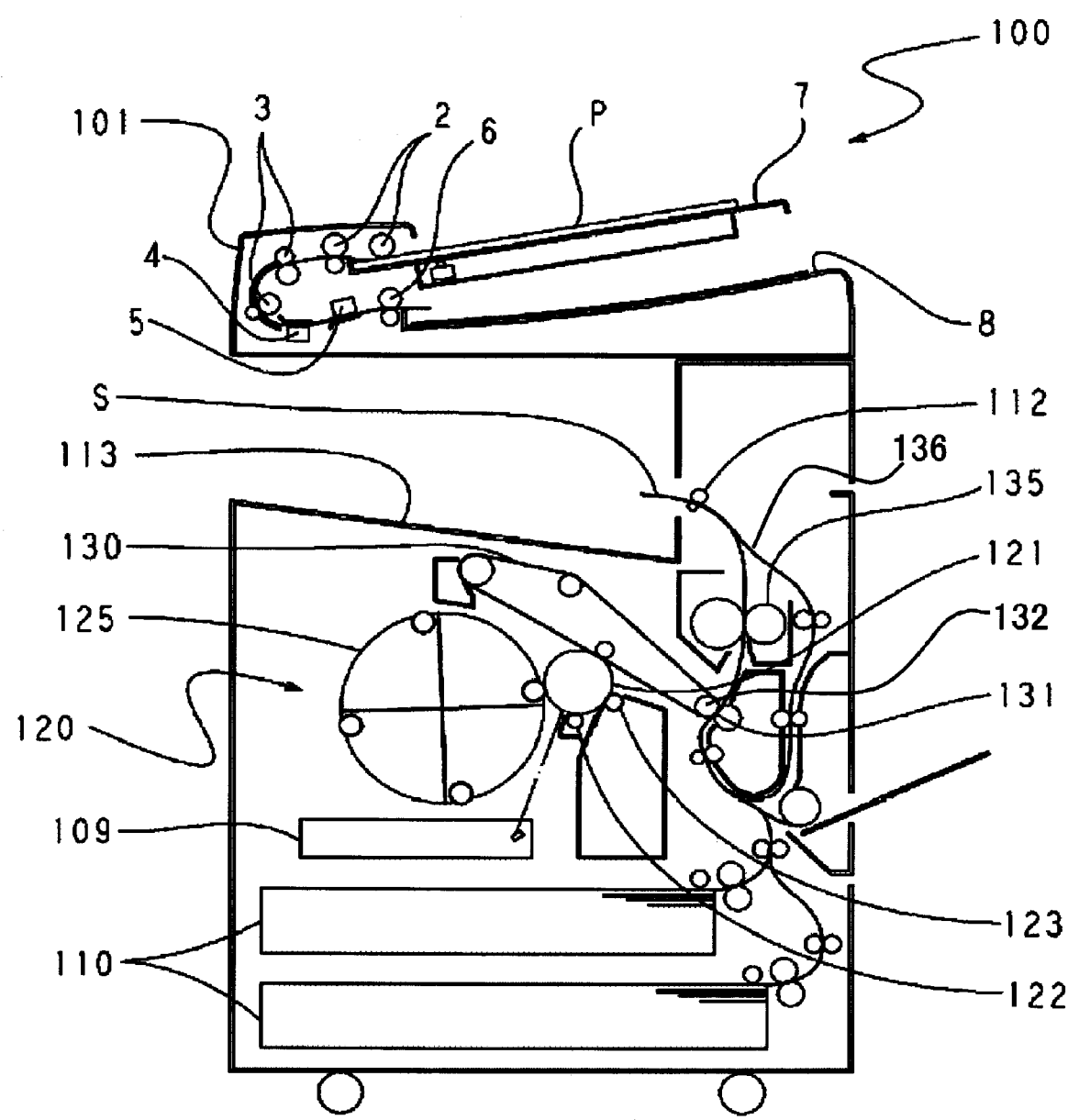
FIG. 1 is a view illustrating a configuration of an image forming apparatus according to an embodiment of the present invention.

FIG. 1 is a view illustrating a configuration of an image forming apparatus according to an embodiment of the present invention. As illustrated in FIG. 1, in the image forming apparatus, an automatic original reading apparatus (image reading apparatus) 101 is disposed in an upper portion of a main body of the image forming apparatus 100.

An original P mounted at a predetermined position of an original base plate 7 is conveyed through an original feeding roller 2 and an original conveying roller 3, so that an image is read by image reading portions 4 and 5. Next, the original P is discharged onto an original discharge tray 8 by an original discharge roller 6.

The image forming portion 120 includes a photosensitive drum 121, a charge roller 122, a rotary developing unit 125, an intermediate transfer belt 130, an inner transfer roller 132, and a cleaner 123.

A surface of the photosensitive drum 121 is charged by the charge roller 122. Electrostatic latent images are formed on the surface of the photosensitive drum 121 according to optical images irradiated by a laser unit 109 based on image information read from the automatic original reading apparatus 101. The formed electrostatic latent images are developed into toner images by the rotary developing unit 125. The developed toner images are transferred onto the intermediate transfer belt 130. The toner images transferred onto the intermediate transfer belt 130 are transferred by the inner transfer roller 132 of a secondary transfer portion 131, onto a sheet S which is conveyed from a sheet cassette 110. After the toner images are transferred, toners remaining on the photosensitive drum 121 are removed by the cleaner 123.

In the sheet S where the toner images are transferred, the toner images are fixed by a fixing unit 135 at the downstream of the image forming portion 120. The sheet S where the toner images are fixed is discharged onto a discharge portion 113 by a pair of discharge rollers 112. In a case where images are to be formed on both sides of the sheet S, the sheet S where the toner images are fixed is conveyed along a double-sided conveying passage 136 to the image forming portion again. In this case, during the discharging of the sheet S by the pair of discharge rollers 112, the pair of the discharge rollers is reversely rotated, so that the sheet S can be inverted to be conveyed along the double-sided conveying passage 136.
(Image Reading Apparatus)

Figure 2:
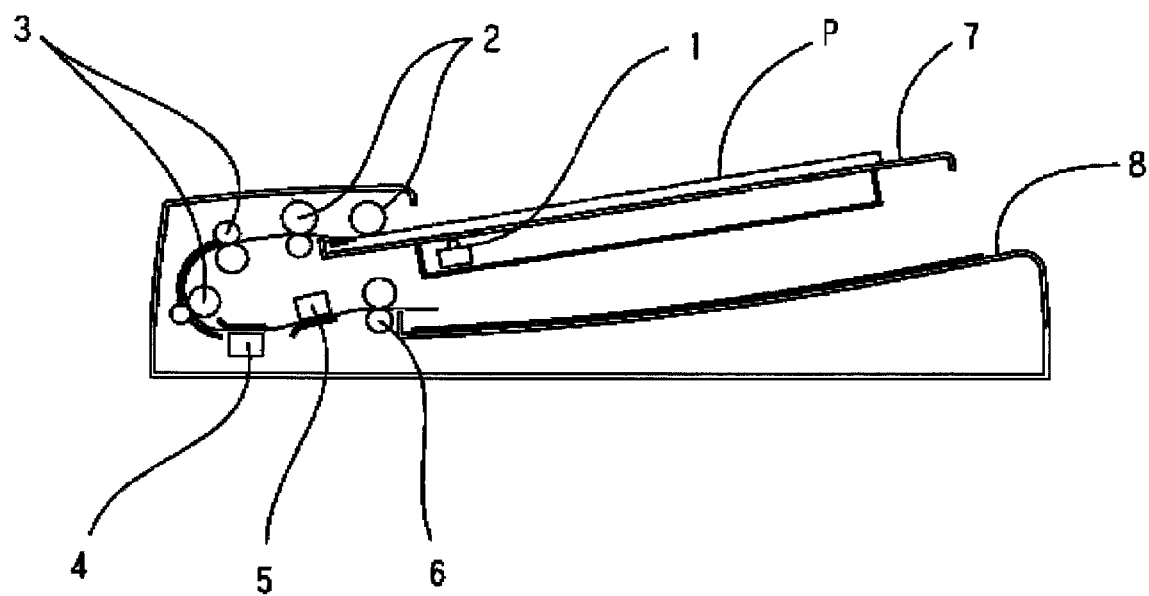
FIG. 2 is a view illustrating a configuration of an image reading apparatus.

FIG. 2 is a view illustrating a configuration of an image reading apparatus. As illustrated in FIG. 2, the automatic original reading apparatus 101 includes an image existence/non-existence detecting sensor (detecting unit) 1, an original feeding roller (conveying unit) 2, a first side image reading portion 4, a second side image reading portion 5, an original discharge roller 6, and an original base plate 7. For the convenience of description, a front surface of an original sheet (in case of an original sheet where images are on both sides, a surface attached with a small page of the original sheet) is referred to as a first surface, and a rear surface thereof is referred to as a second surface.

The image existence/non-existence detecting sensor 1 detects existence or non-existence of image (image existence/non-existence information) of each original sheet of a bundle of original sheets mounted on the original base plate 7. The bundle of original sheets of which existence or non-existence of image is detected is separated and fed sheet by sheet by the original feeding roller 2. While the original P picked up by the original feeding roller 2 is conveyed along the original sheet conveying path, a first side image (image of the one side) is read by the first side image reading portion (first image reading unit) 4, and a rear side image (image of the other side) is read by the second side image reading portion (second image reading unit) 5. The original P of which image information is read is discharged onto the original discharge tray 8.
(Image Reading Based on Transmission-Type Image Existence/Non-Existence Detecting)

Transmission-type image existence/non-existence detecting is described with reference to FIGS. 3 to 7.

Figure 3A:
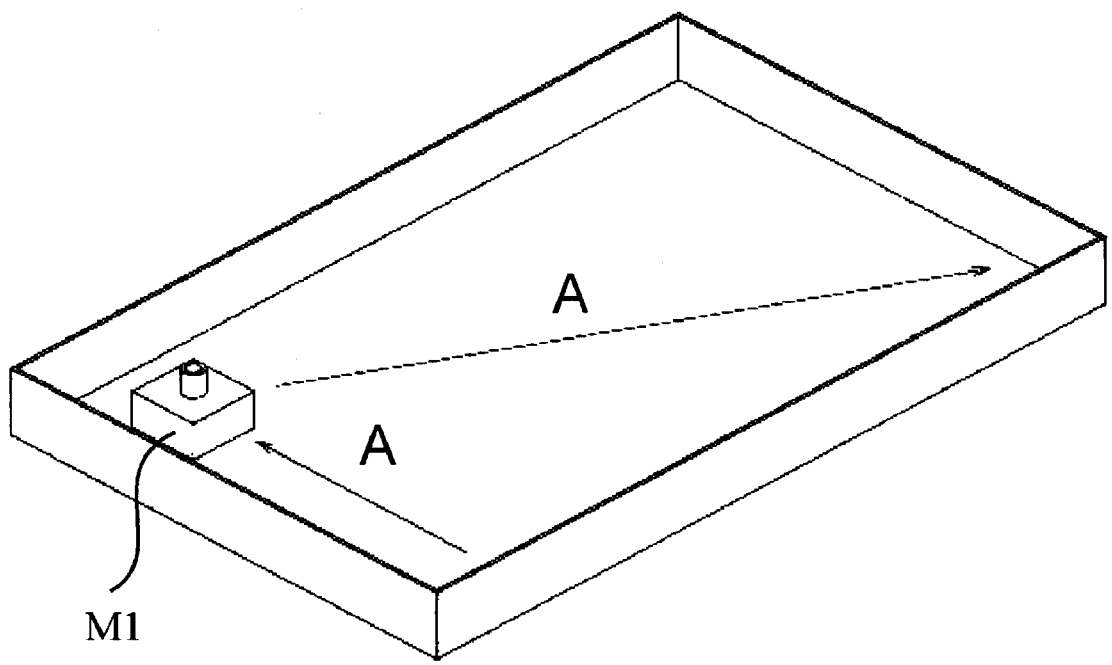
FIG. 3A is a view for describing operations of an image existence/non-existence detecting sensor.
Figure 3B:
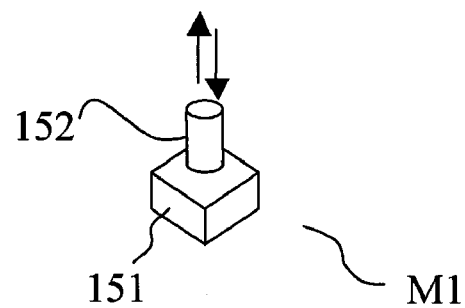
FIG. 3B is a perspective view illustrating an image existence/non-existence detecting sensor.

As illustrated in FIG. 3B, in the image existence/non-existence detecting sensor 1, a light source portion is miniaturized by using a semiconductor mode-locked laser, so that an image existence/non-existence sensing portion 21 (see FIG. 4) can be configured as a module M1. The image existence/non-existence sensing module M1 includes a module portion 151 and a transmitting passage 152. The module unit 151 can guide an electromagnetic wave to a vicinity of a to-be-measured object at low loss. As illustrated in FIG. 3A, the existence or non-existence of image information can be detected by scanning the original with the module M1 along a trajectory indicated by arrow A.

Figure 4:
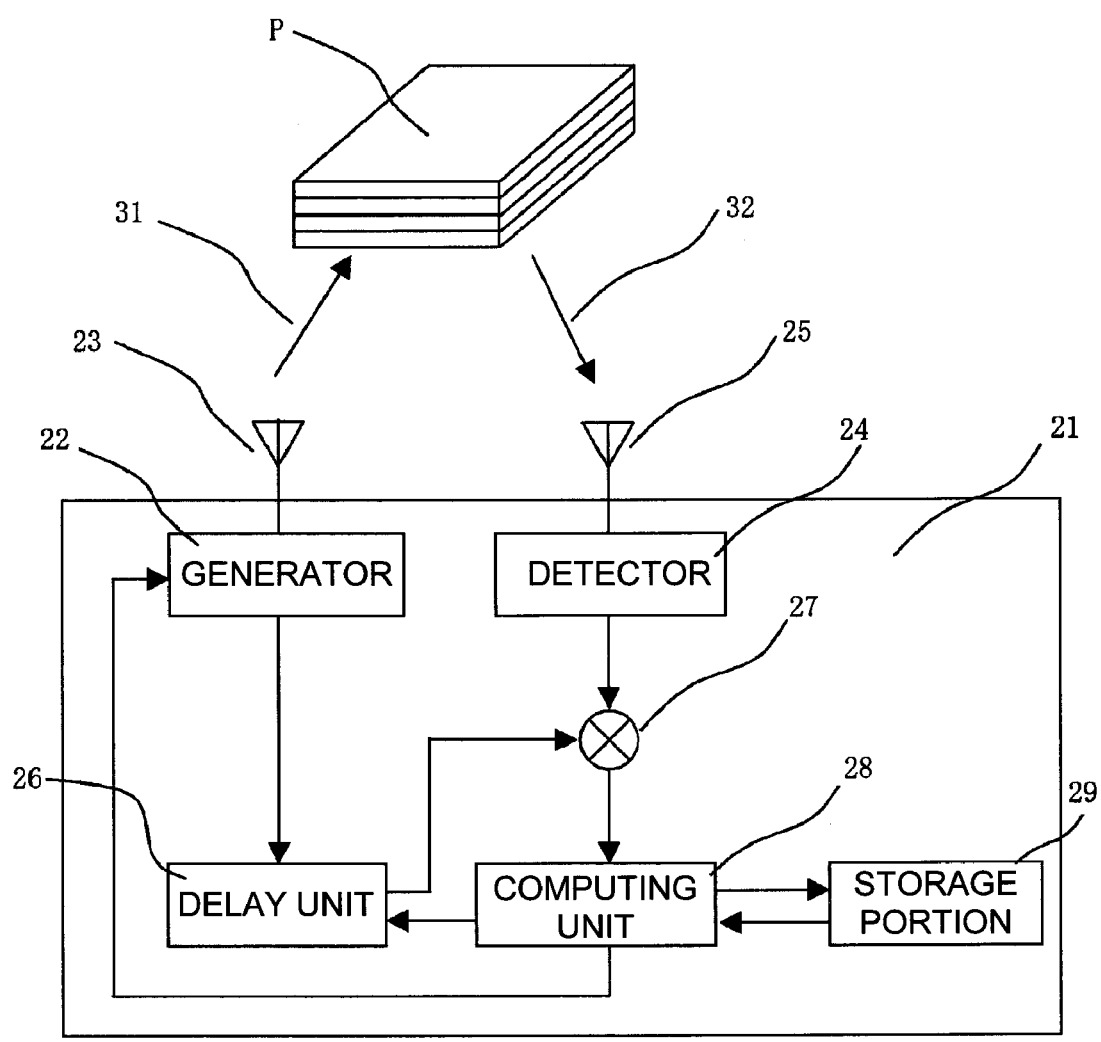
FIG. 4 is a view for describing principle of an image existence/non-existence detecting sensor.

Now, as illustrated in FIG. 4, a case of reading character information written on each front side of or an inner portion of plural-stacked original sheets P is described. The automatic original reading apparatus 101 includes an object information sensing portion (image existence/non-existence sensing portion) 21 having an electromagnetic wave transmitting/receiving portion. The sensing portion 21 includes an electromagnetic wave pulse generator (oscillating unit) 22, an antenna 23, an antenna 25, a detector (receiving unit) 24, a delay unit 26, a mixer 27, a computing unit 28, and a storage portion 29. All the above components can be unified or integrated into one casing. However, all the components are not necessarily included in the one casing.

The electromagnetic wave pulse generator 22 oscillates a transmitting pulse (electromagnetic wave pulse) 31 having a frequency of 30 GHz to 100 THz. The transmitting pulse 31 radiates into the space towards the bundle of original sheets from the antenna 23. The transmitting pulse 31 is reflected on each side of the original P. The reflected pulse (reflected wave) 32 is received by the antenna 25 and received by the detector 24. The delay unit 26 delays pulse generating timing of the generator 22. The mixer 27 mixes the delayed transmitting pulse with the received pulse. The computing unit 28 identifies a distance from the sheet-shaped object (a position of the side of the original sheet) based on the actual delay time τ.

As an example of a material of the original P, paper may be used. In addition, a printing ink or a ballpoint pen ink may be used as an example of a material for writing character information on a surface of or in an inner portion of the original P. The storage portion 29 stores data of a change in wave of the reflected pulses 32 which are reflected on the paper or the ink. The storage portion 29 can be randomly accessed by the computing unit 28.

The mixer 27 can obtain highest output by matching the timing of the delayed signal of the transmitting pulse with the timing of the received pulse 32. The computing unit 28 sweeps and controls the delay amount of the delay unit 26 and monitors the output of the mixer 27 to identify the delay time of transmission of the reflected pulse 32, so that the distance from each sheet-shaped object (original P) can be detected.

Here, the output of the transmitting pulse 31 from the generator 22 can be varied at a low frequency with the order of 100 kHz, so that a well-known synchronized detection technique may be used for extracting the mixing output of the output of the mixer 27 and a low frequency signal thereof.

Figure 5:
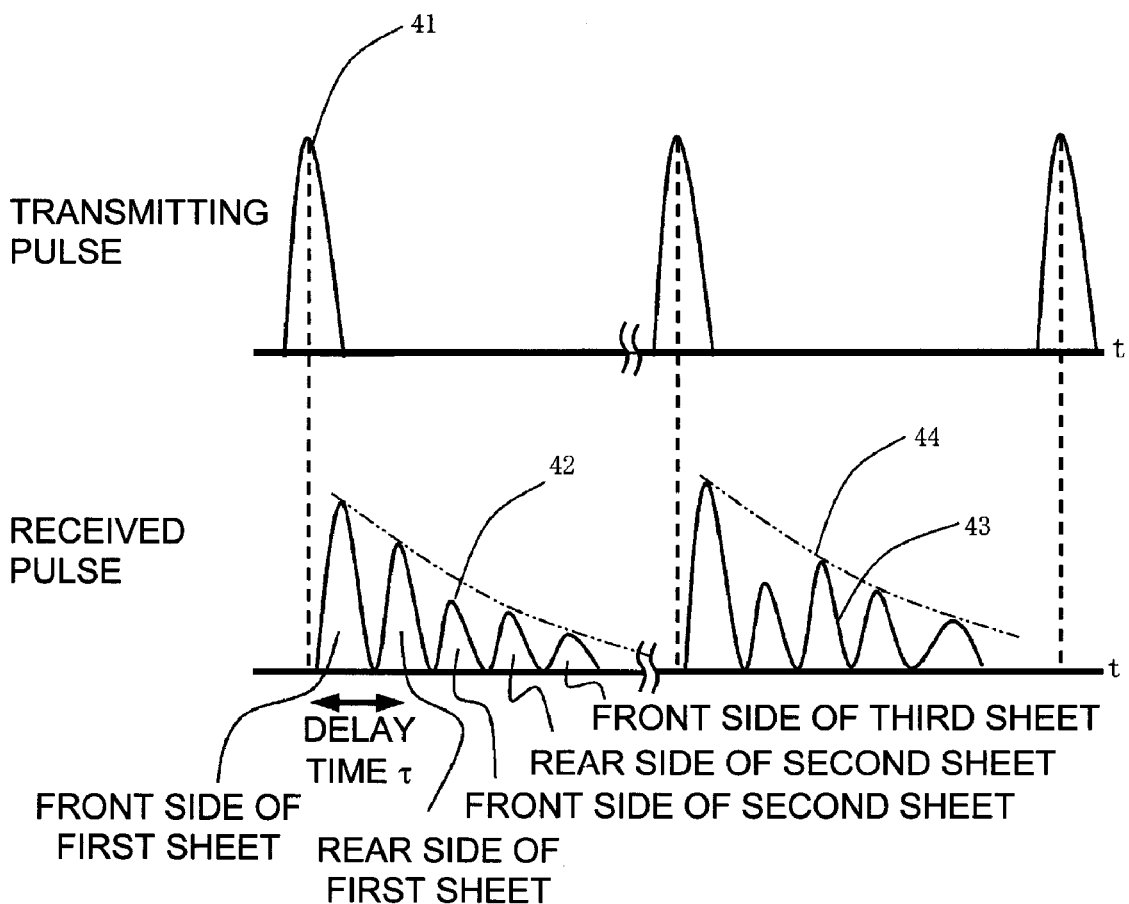
FIG. 5 is a view for describing principle of a transmission-type image existence/non-existence detecting using electromagnetic wave pulses.

A method of detecting information on a surface of or in an inner portion of each sheet-shaped object by using the reflected pulse 32 is described with reference to FIG. 5. As illustrated in FIG. 5, if a transmitting pulse 31 at a predetermined time has a time waveform indicated by reference numeral 41, the pulse is reflected from the interfacing sides of the plural-stacked sheet-shaped objects, and thus, plural reflected echo pulses are received. If a thickness of the sheet is "d", the electromagnetic waves reflected from the front and rear sides of the sheet propagate a free space at the speed of light c, so that a time difference of $\tau=2d/c$ (1) occurs between the reflected waves. Actually, the time difference is increased by $\sqrt{e}$ according to a dielectric constant e of a material for the sheet-shaped object.

Due to absorption or reflection loss in the sheet-shaped object, intensities of the plural pulses 42 and 43 are observed to be gradually decreased as illustrated in FIG. 5. Accordingly, by counting the pulses, it can be determined which sheet in the sheet-shaped object the observed information is originated from, with respect to the incident side of the electromagnetic wave.

In this manner, by obtaining information in the thickness direction all at once, the observation point of the sheet-shaped object is scanned in the inward direction. Accordingly, three-dimensional information of the stacked sheet-shaped object can be obtained, and image existence/non-existence data of a surface of or in an inner portion of each sheet can be detected.

Figure 6:
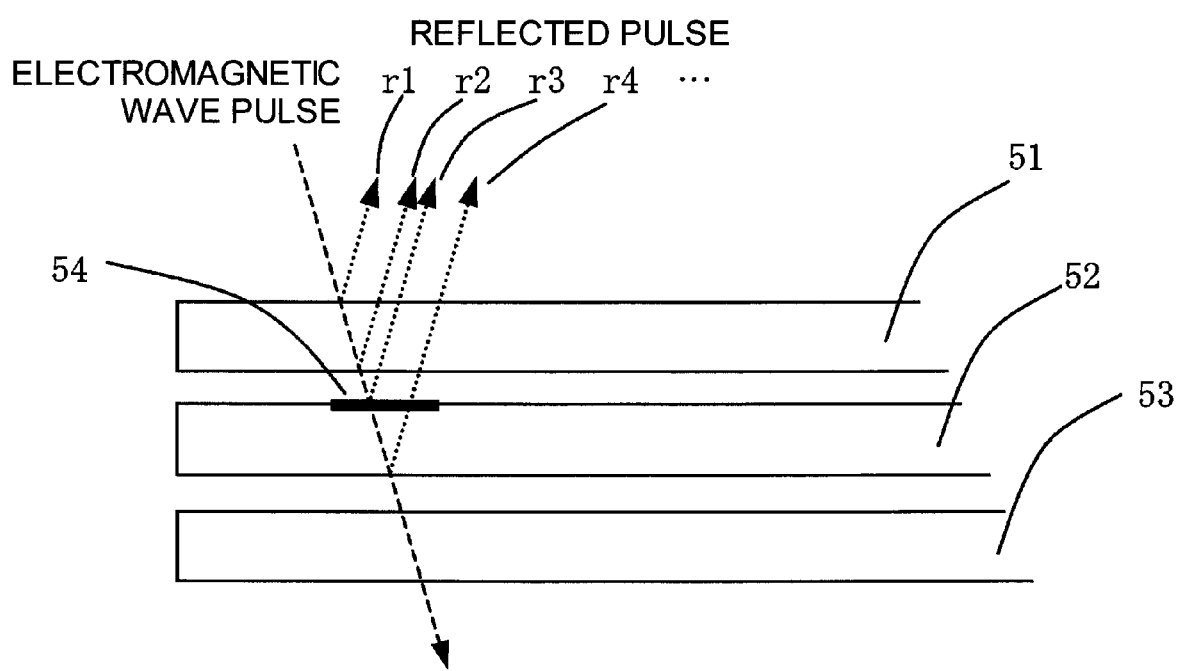
FIG. 6 is a view for describing principle of a transmission-type image existence/non-existence detecting using electromagnetic wave pulses.

For example, as illustrated in FIG. 6, an image 54 exists on the first side (front side) of the third sheet of paper, and the scanning is performed along the trajectory indicated by arrow A illustrated in FIG. 3A. In this case, a reflected pulse waveform varies with the image 54, that is, according to the existence or non-existence of toner. As illustrated in FIG. 6, the electromagnetic wave pulse reflects on the surface of each sheet 51 to 53, so that reflected pulses r1, r2, and r3 occur. At the point of the image 54, an intensity of the reflected pulse r3 reflected from the first side (front side) of the second sheet of paper is absorbed by the toner, an intensity of a received pulse reflected from the image, that is, the received pulse 42 of FIG. 5 is less than that of the case where there is no toner, so that "black" (existence of image information) is determined. On the other hand, an intensity of a received pulse reflected from a no-toner portion, that is, the received pulse 43 of FIG. 5 is equal to that of a normal intensity decrease curve 44, so that "white" (non-existence of image information) is determined.

In this manner, image existence/non-existence information of the stacked sheet-shaped object in a bundle of the sheets can be read out as electronic data.

Figure 7:
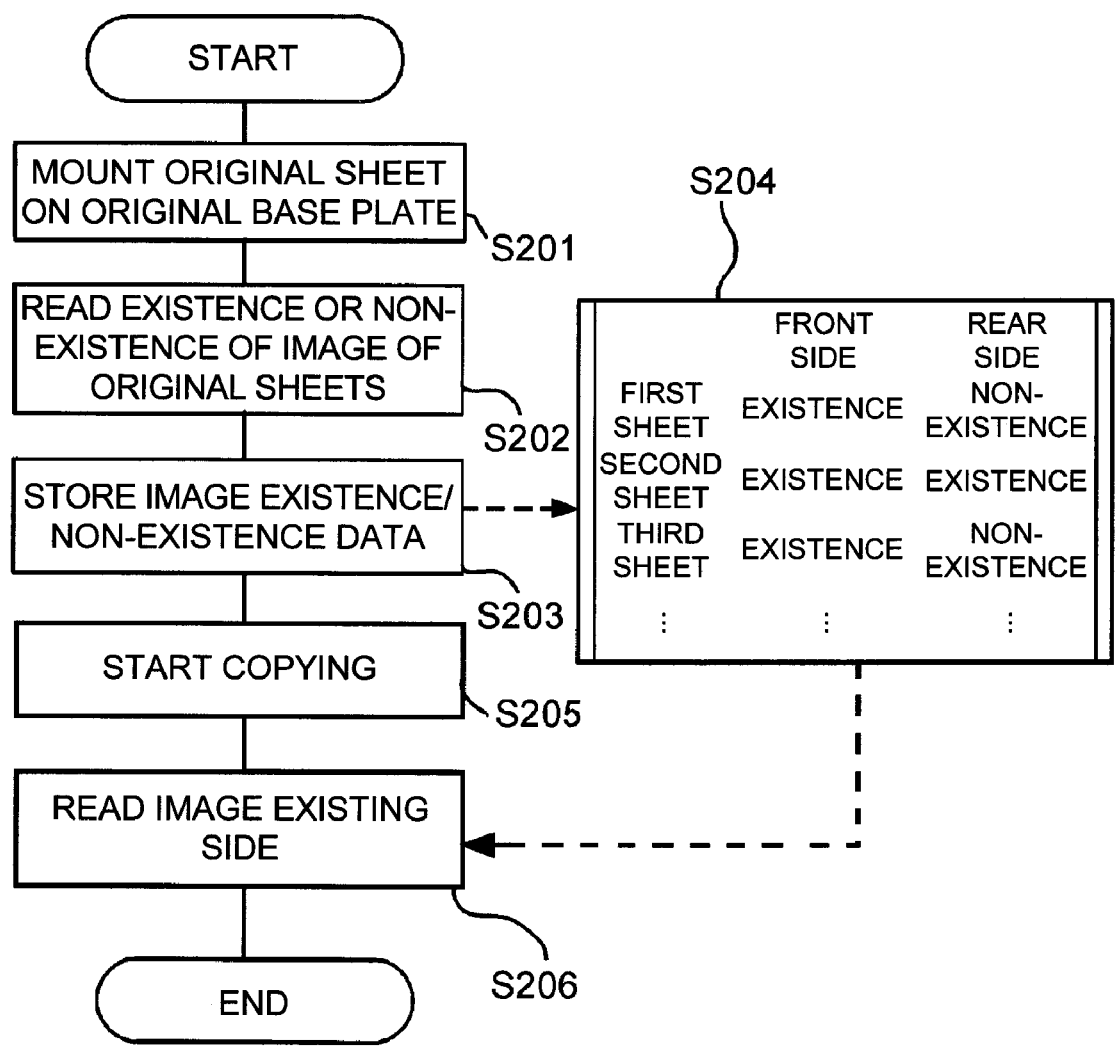
FIG. 7 is a flowchart illustrating image existence/non-existence detecting operations and image reading operations.

FIG. 7 is a flowchart illustrating image existence/non-existence detecting operations and image reading operations. As illustrated in FIG. 7, a bundle of original sheets is mounted on the original base plate 7 (S201). The image existence/non-existence detecting sensor 1 starts detecting existence or non-existence of images in the bundle of original sheets (S201). The detected image existence/non-existence data in all the sides of the original sheets in the bundle are stored (S203).

When COPY button is pressed (S205), only the sides where images exist are read based on the stored image existence/non-existence data (S206). As illustrated in FIG. 2, while the original P picked up by the original feeding roller 2 is conveyed along the original sheet conveying path, an image of a first side (front side) is read by the first side image reading portion 4, and an image of a second side (rear side) is read by the second side image reading portion 5. If it is determined based on the image existence/non-existence data indicating that there is no image, image reading operations are not performed, and any image data are not stored.

At the same time of the above operations, image forming operations are performed. As an example, it is assumed that the first original sheet has an image on the first side but no image on the second side, and the second original sheet has images on both of the first and second sides. In this case, the image forming operations are as follows.

In the image forming portion, the second side image of the second original sheet is formed onto the one side of a first to-be-transferred sheet S1 which is sent from a sheet cassette 110. Next, the to-be-transferred sheet S1 where the second side image of the second original sheet is transferred by a transfer portion 131 of the image forming portion is fixed. The to-be-transferred sheet S1 is inverted to be conveyed along a double-sided conveying passage 136.

Just after the second side image of the second original sheet is transferred onto the one side of the first to-be-transferred sheet S1, the first side image of the first original sheet is formed on the one side of a second to-be-transferred sheet S2 which is sent from the sheet cassette 110, in the image forming portion.

Before the transferring of the first side image of the first original sheet onto the second to-be-transferred sheet S2, the conveying speed of the double-sided conveying passage 136 is increased, so that the first to-be-transferred sheet S1 is conveyed to the transfer-standby position for the second side image. Next, just after the first side image of the first original sheet is transferred onto the second to-be-transferred sheet S2, the first side image of the second original sheet is transferred onto the other side of the first to-be-transferred sheet S1. Herein, the other side of a to-be-transferred sheet denotes a rear side opposite to the one side.

The to-be-transferred sheet S1 where the first side image of the first original sheet is transferred is discharged to a discharge portion 113. Subsequently, the to-be-transferred sheet S2 where both side images of the second original sheet are transferred is discharged. In this case, since the first original sheet has no image on the second side, the to-be-transferred sheet S1 is discharged immediately after the first side image of the first original sheet is formed. Accordingly, it is possible to remove unnecessary operations. In this manner, it is possible to optimally perform image forming operations according to the existence or non-existence of image of original sheets.

Furthermore, in another embodiment, by using a controller (not illustrated), it is possible to perform the image forming operations with the optimal or highest speed according to the existence or non-existence of image of original sheets.

As described above, existence or non-existence of image on each side (front side and rear side) of each original sheet can be detected in a state that a bundle of original sheets are mounted on the original base plate 7. Next, based on the detected information (received electromagnetic wave information, that is, image existence/non-existence data), the image reading is performed on the only sides (image existing sides) that the image reading is needed, by using the first side image reading portion 4 and second side image reading portion 5. Therefore, in comparison with a configuration where the existence or non-existence of image is detected after conveying the original sheet, it is possible to reduce the reading time. In addition, in comparison with a configuration where the image of each original sheet is read, since the image reading is performed in the state that a bundle of original sheets are mounted on an original base plate 7, it is possible to improve an accuracy of image reading at low costs.

Furthermore, it is possible to perform conveying to-be-transferred sheets and transferring images thereon with the optimal or highest speed according to the detected information (image existence/non-existence data), thereby improving the productivity of image forming.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-148989, filed Jun. 6, 2008, which is hereby incorporated by reference herein in its entirety.

What is claimed is:
1. An image reading apparatus comprising:
an original base plate on which a bundle of original sheets are mounted;
a conveying unit which separates and conveys the bundle of original sheets sheet by sheet;
a first image reading unit which reads image information from the one side of the original sheet conveyed by the conveying unit;
a second image reading unit which reads image information from the other side of the original sheet; and a detecting unit which detects image existence/non-existence information of each original sheet in a state that the bundle of original sheets is mounted on the original base plate, wherein the detecting unit includes an oscillating unit which oscillates an electromagnetic wave of 30 GHz to 100 THz and a receiving unit which receives a reflected wave of the electromagnetic wave reflected on each side of the sheet, thereby detecting the image existence/non-existence information of each original sheet based on the received electromagnetic wave information.

2. The image reading apparatus according to claim 1, wherein existence or non-existence of the image information of each side of each original sheet is detected based on the electromagnetic wave information received by the detecting unit, and the first image reading unit and the second image reading unit perform image reading operations on the only side where the image information of each original sheet exists.

3. The image reading apparatus according to claim 1, wherein the detecting unit identifies a position of each side of each original sheet based on a delay time of an electromagnetic wave reflected from the each side in the bundle of original sheets.

4. The image reading apparatus according to claim 1, wherein the detecting unit determines that image information exists if an intensity of a reflected pulse is less than that of a case where there is no image information.

5. An image forming apparatus comprising:

the image reading apparatus according to claim 1; and an image forming portion which forms an image based on the image information read by the image reading apparatus.

* * * * *